United States Patent [19]

Kharazi et al.

[11] Patent Number: 5,972,267
[45] Date of Patent: Oct. 26, 1999

[54] PROCESS FOR THE PRODUCTION OF A THERMOSETTING COMPOSITION

[75] Inventors: Alex Kharazi, Somerset; Neil William Dunchus, Kinnelon, both of N.J.

[73] Assignee: Union Carbide Chemicals & Plastics Technology Corporation, Danbury, Conn.

[21] Appl. No.: 09/050,566

[22] Filed: Mar. 30, 1998

[51] Int. Cl.$^6$ ................................................. B29C 71/02
[52] U.S. Cl. ..................... 264/134; 264/140; 264/235; 264/346; 427/222; 427/372.2; 427/422
[58] Field of Search ................................ 264/5, 7, 11, 13, 264/85, 129, 134, 140, 234, 235, 345, 346; 427/212, 213, 222, 331, 372.2, 375, 393.5, 422

[56] References Cited

U.S. PATENT DOCUMENTS

| | | | |
|---|---|---|---|
| 3,455,752 | 7/1969 | Gray et al. | 156/51 |
| 3,644,315 | 2/1972 | Gardner et al. | 525/105 |
| 3,830,872 | 8/1974 | Schrage et al. | 525/263 |
| 4,058,583 | 11/1977 | Glander et al. | 264/171.19 |
| 4,071,325 | 1/1978 | Platz et al. . | |
| 4,452,750 | 6/1984 | Handwerk et al. . | |
| 4,615,664 | 10/1986 | Kolossow . | |
| 4,832,915 | 5/1989 | Messura et al. . | |
| 5,212,349 | 5/1993 | Pelzer . | |
| 5,573,790 | 11/1996 | Wehjte et al. | 264/346 |

*Primary Examiner*—Jan H. Silbaugh
*Assistant Examiner*—Kenneth M. Jones
*Attorney, Agent, or Firm*—D. T. Black; P. W. Leuzzi

[57] ABSTRACT

A process comprising the following steps: (a) maintaining the process in an essentially oxygen-free state; (b) introducing a first polymer directly from the polymerization reactor in which it was prepared, in molten form, into a mixer/compounder; (c) reducing any higher pressure accompanying the first polymer from the polymerization reactor to the mixer/compounder to a pressure in the range of about 0 to about 5 barg; (d) adding additives selected from the group consisting of antioxidants, second polymers, other polymer enhancing additives, and mixtures thereof to the mixer/compounder, and mixing same with the molten first polymer; (e) passing the molten mixture from step (d) through one or more screens, each having a maximum opening size of about 25 microns; (f) pelletizing the mixture from step (e); (g) introducing the pellets into a spraying chamber, the interior of said chamber being operated in a static condition; (h) spraying the pellets in the chamber with a crosslinking formulation including an organic peroxide and, optionally, a scorch retarder and/or a cure booster to coat the pellets; and (i) annealing the coated pellets to impregnate the pellets with the crosslinking formulation.

5 Claims, No Drawings

PROCESS FOR THE PRODUCTION OF A THERMOSETTING COMPOSITION

TECHNICAL FIELD

This invention is related to a process for the production of a thermosetting composition useful in the manufacture of power cable insulation.

BACKGROUND INFORMATION

A typical power cable generally comprises one or more conductors in a cable core that is surrounded by several layers of polymeric material including a first semiconducting shield layer, an insulating layer, a second semiconducting shield layer, a metallic tape or wire shield, and a jacket. Thermosetting power cable compositions are currently produced via one of two types of off-line processes in which polymerization, mixing, and vulcanization are carried out independently. A thermoplastic polymer is supplied to the mixer in the form of pellets (granules), fluff, or powder. The purpose of the mixer is to incorporate functional and stabilizing additives into the polymer. Then, the polymer/additive mixture is subjected to vulcanization where crosslinking agents are added. A variant of the off-line production process is practiced when the thermoplastic polymer/additive mixture is mixed with a crosslinking agent in a mixer/extruder during fabrication of the power cable. This process is referred to as the direct injection process and combines the vulcanization step with the fabrication step. In both of these processes, filtration is effected, somewhat inefficiently because of low throughput rates. Due to decomposition and the reaction of the crosslinking agent in the fabricating extruder, periodic shutdowns of the extruder must be made to remove crosslinked product (scorch) from the wire. Thus, the aforementioned processes suffer from inefficiency and a lack of cleanliness.

A thermosetting polymer is a polymer capable of being changed into a substantially infusible or insoluble product by the addition of heat or radiation wherein the primary change to the polymer is chemical. The net effect of the chemical change is to link the polymer chains thereby increasing the polymer's weight average molecular weight. A thermoplastic polymer, on the other hand, is one which is capable of being softened by heating and hardened by cooling through a characteristic temperature range. For polyolefins, that temperature range is typically about 80 to about 170 degrees C. The change to the polymer on heating is substantially physical.

All power cable products including semiconductive power shields and dielectric insulation materials are valued for their purity or freedom from unintended additives, which are considered to be contaminants. Since the power cable will be exposed to high voltages, minute extraneous particles such as metal, inorganic oxides, salts, and polar organic substances, when permitted to be present in the power cable tend to cause deterioration, disrupt the insulation, and shorten the service life of the power cable. Contaminants to power cable compounds include any organic or inorganic substance not specifically detailed in the product formulation. This includes very highly crosslinked polymer and thermally or oxidatively degraded polymer particles in the final product. Power cable insulation is partially specified and sold by identifying the number and size of contaminants in a given size range contained in a given mass of product. The size ranges specified for these contaminants vary by product and geographic market, typically beginning at 0.004 inches or 100 microns. There is an industrial need for thermosetting power cable compositions, which have a low level of contaminants, both in number and size.

DISCLOSURE OF THE INVENTION

An object of this invention is to provide a process for the preparation of a thermosetting composition, which is useful in the production of power cable, and has a low level of contaminants. Other objects and advantages will become apparent hereinafter.

According to the invention, a process has been discovered, which meets the above object. The process comprises the following steps:

(a) maintaining the process in an essentially oxygen-free state;

(b) introducing a first polymer directly from the polymerization reactor in which it was prepared, in molten form, into a mixer/compounder;

(c) reducing any higher pressure accompanying the first polymer from the polymerization reactor to the mixer/compounder to a pressure in the range of about 0 to about 5 barg;

(d) adding additives selected from the group consisting of antioxidants, second polymers, other polymer enhancing additives, and mixtures thereof to the mixer/compounder, and mixing same with the molten first polymer;

(e) passing the molten mixture from step (d) through one or more screens, each having a maximum opening size of about 25 microns;

(f) pelletizing the mixture from step (e);

(g) introducing the pellets into a spraying chamber, the interior of said chamber being operated in a static condition;

(h) spraying the pellets in the chamber with a crosslinking formulation including an organic peroxide and, optionally, a scorch retarder and/or a cure booster to coat the pellets; and (i) annealing the coated pellets to impregnate the pellets with the crosslinking formulation.

DESCRIPTION OF THE PREFERRED EMBODIMENT(S)

Step (a), the maintenance of the process in an essentially oxygen-free state, is accomplished by carefully connecting the apparatus used in carrying out the process to avoid leakage, and, in some cases, using nitrogen to prevent the entry of oxygen.

In step (b), the first polymer, a thermoplastic resin, is introduced into the mixer/compounder in molten form. It will be understood that the resin either comes from the reactor in molten form or is melted on entry into the mixer/compounder. In any case, it must be in molten form to receive the additives, which are mixed and compounded into the resin in step (d).

In steps (b) and (d), the first and second polymers mentioned above are thermoplastic resins, which can be any homopolymer or copolymer produced from two or more comonomers, or a blend of two or more of these polymers, conventionally used as insulating and/or jacketing materials in wire and cable applications, particularly power cable applications. Generally, the monomers useful in the production of these homopolymers and copolymers will have 2 to 20 carbon atoms. Examples of such monomers are alpha-olefins such as ethylene, propylene, 1-butene, 1-hexene, 4-methyl-1-pentene, and 1-octene; unsaturated esters such as vinyl acetate, ethyl acrylate, methyl acrylate, methyl methacrylate, t-butyl acrylate, n-butyl acrylate, n-butyl methacrylate, 2-ethylhexyl acrylate, and other alkyl acrylates; diolefins such as 1,4-pentadiene, 1,3-hexadiene, 1,5-hexadiene, 1,4-octadiene, and ethylidene norbornene; other monomers such as styrene, p-methyl styrene, alpha-methyl styrene, vinyl naphthalene, and similar aryl olefins; nitriles such as acrylonitrile and methacrylonitrile; vinyl methyl ketone, vinyl methyl ether, and maleic anhydride; and acrylic acid, methacrylic acid, and other similar unsaturated acids. In addition to polyolefins, included among the polymers can be polyesters, polycarbonates, and polyurethanes. The homopolymers and copolymers of ethylene are preferred. The resins are preferably non-halogenated.

Examples of homopolymers and copolymers of ethylene are high pressure, low density homopolymers of ethylene; low pressure homopolymers of ethylene and copolymers of ethylene and alpha-olefins of various densities wherein the comonomer can be 1-butene, 1-hexene, 4-methyl-1-pentene, or 1-octene; ethylene/propylene rubber; ethylene/propylene/ diene monomer rubber; ethylene/vinyl acetate copolymer; ethylene/ethyl acrylate copolymer; isobutylene/isoprene rubber and polybutene-1.

The thermoplastic resins can be produced in a conventional manner by a wide variety of well known catalytic processes. The processes are generally distinguished by their catalyst systems and examples of same are as follows: magnesium/titanium based catalyst systems, which can be exemplified by the catalyst system described in U.S. Pat. No. 4,302,565; vanadium based catalyst systems such as those described in U.S. Pat. Nos. 4,508,842 and 5,332,793; 5,342, 907; and 5,410,003; a chromium based catalyst system such as that described in U.S. Pat. No. 4,101,445; metallocene catalyst systems such as those described in U.S. Pat. Nos. 4,937,299 and 5,317,036; or other transition metal catalyst systems. Many of these catalyst systems are often referred to as Ziegler-Natta catalyst systems. Catalyst systems, which use chromium or molybdenum oxides on silica-alumina supports, are also useful. Typical processes for preparing the polyethylenes are also described in the aforementioned patents. Typical in situ polyethylene blends and processes and catalyst systems for providing same are described in U.S. Pat. Nos. 5,371,145 and 5,405,901. Insofar as polypropylene processes are concerned. U.S. Pat. Nos. 4,414,132 and 5,093,415 can be mentioned. These processes also use Ziegler-Natta, metallocene, etc. catalyst systems, but generally include an outside electron donor.

The second polymer is optional, and can be added to modify the rheological characteristics of the primary resin; to enhance the electrical performance of the compound; and/or to improve the compatibility with other additives in the compound.

In effecting the process of the invention, a polymerization reactor, a mixer/compounder, filter means, a pelletizer, and a vulcanization unit are positioned in-line. The reactor can be a high pressure design (greater than 1500 psi operating pressure), a low pressure design (less than 1500 psig operating pressure) or a slurry reactor. The polymer composition is maintained as a thermoplastic into the vulcanization unit where it is converted into a thermosetting composition, which simply means that the addition of a crosslinking agent in that unit puts the thermoplastic composition in such a state that the application of heat will crosslink and thermoset the composition. The thermosetting of the composition is accomplished during the fabrication of the power cable, which is not part of the process of this invention. The term "in-line" with respect to the positioning of the various pieces of apparatus simply means that the pieces of apparatus are physically connected in series in such a manner that the time lag with respect to transfer of the polymer composition from unit to unit is minimal. Thus, the dwell time in the process from the point of exiting the reactor to the inlet of the vulcanization unit is in the range of about 0.5 to about 6 hours, the shorter times being preferred. The physical state and morphology of the product leaving the reactor is the one indigenous to the polymerization process used and is not altered before being fed to the mixer/compounder. For current olefins reactors, either molten polymer, fluff polymer (particle sizes from 0.5 to 50 microns) or powder (particle size greater than 50 microns) will be delivered to the mixer/compounder. The throughput rate of the mixer/ compounder must be equal to or greater than the conversion (operating rate) of the polymerization reactor.

In the case of high pressure olefins reactors, which are operated at 1500 to 4000 barg (bar gauge), a pressure reducing vessel is used to make the reduction of pressure from the reactor to the inlet of the mixer/compounder, which is operated at 0 to 5 barg. This pressure reduction is referred to in step (c). Any higher pressure is reduced to this range regardless of whether it comes from a high pressure reactor or not. The pressure reducing vessel is positioned in-line between the reactor and the mixer/compounder. In some cases, it can be bolted directly to the mixer/compounder. Typically, a round orifice of 50 to 250 millimeters in diameter is used to connect the pressure reducing vessel to the mixer/compounder. A metering device, such as a modulating control valve, is installed between the pressure reducing vessel and the mixer/compounder and is used to equilibrate the rate of the olefins reactor and mixer/compounder. Rate matching is done by conserving the polymer level in the pressure reducing vessel. The preferred operating conditions for the process of the invention are a polymer melt temperature of 250 degrees C at a reactor conversion rate of 8.0 metric tons per hour; operating conditions can be, however, in a temperature range of 225 to 300 degrees C at a reactor conversion rate of 7.0 to 12.5 metric tons per hour. An olefin monomer concentration of 1000 to 2000 ppm is preferably maintained in the polymer stream from the reactor and is contained in the pressure reducing vessel. The olefin monomer concentration in the pressure reducing vessel ensures that olefin monomer in the same concentration will be present in the feed section of the mixer/compounder thereby functioning as a means to exclude oxygen from the mixer/compounder. The olefin monomer concentration reduces the occurrence of oxidative degradation during the mixing step yielding a purer thermoplastic intermediate.

By directly connecting the pressure reducing vessel to the polymer mixer/compounder, oxygen is essentially excluded from entering the polymer mixing process at this point. Alternatively, in the case of a low pressure olefins reactor, oxygen is essentially excluded from the mixer/compounder by introducing nitrogen into the mixer/compounder feed hopper. The concentration of oxygen in the feed hopper is preferably reduced below 15 ppm by volume in either the high pressure or low pressure case.

In step (d), additives are added to the mixer/compounder, often via a secondary extruder. The additives are generally antioxidants, second polymers such as those exemplified above, and other polymer enhancing additives. The additives, in addition to the antioxidants and second polymers, are exemplified by coupling agents, ultraviolet absorbers or stabilizers, antistatic agents, pigments, dyes, nucleating agents, reinforcing fillers, resistivity modifiers such as carbon black, slip agents, plasticizers, processing aids, lubricants, viscosity control agents, tackifiers, antiblocking agents, surfactants, extender oils, metal deactivators, voltage stabilizers, flame retardant fillers and additives, crosslinking boosters and catalysts, and smoke suppressants. Additives can be added in amounts ranging from less than about 0.1 to more than about 5 parts by weight for each 100 parts by weight of the resin. Fillers are generally added in larger amounts up to 200 parts by weight or more.

Examples of antioxidants are: hindered phenols such as tetrakis[methylene(3,5-di-tert-butyl-4-hydroxyhydrocinnamate)]-methane, bis[(beta-(3,5-ditert-butyl-4-hydroxybenzyl)-methylcarboxyethyl)]sulphide, 4,4'-thiobis(2-methyl-6-tert-butylphenol), 4,4'-thiobis(2-tert-butyl-5-methylphenol), 2,2'-thiobis(4-methyl-6-tert-butylphenol), and thiodiethylene bis(3,5-di-tert-butyl-4-hydroxy)hydrocinnamate; phosphites and phosphonites such as tris(2,4-di-tert-butylphenyl)phosphite and di-tert-butylphenyl-phosphonite; thio compounds such as dilaurylthiodipropionate, dimyristylthiodipropionate, and distearylthiodipropionate; various siloxanes; and various amines such as polymerized 2,2,4-trimethyl-1,2-dihydroquinoline. Antioxidants can be used in amounts of about 0.1 to about 5 parts by weight per 100 parts by weight of resin.

The mixer/compounder is configured so as to raise the temperature of the polymer/additives mixture which enters at about 225 to about 290 degrees C to a temperature in the range of about 250 to about 360 degrees C before entering the polymer filtration device in step (e). This is done through work added to the mixture through viscous energy dissipation during mixing and homogenization of the entering feed stream components. Because of the elevated temperature, fine filtration through screens with a maximum opening size of about 25 microns (500 mesh per inch U.S. and greater) is possible at high rates (about 7.0 to about 12.5 metric tons per hour). A nominal filtering screen area exceeding 1900 square centimeters can be used to reach the preferred throughput rate range. The use of fine screens allows complete removal of hard, non-friable contaminant particles down to the opening size of the screens used, as well as the attrition or capture of friable polymeric particles. It is desirable to operate the process with filter screen mesh openings as small as about 15 microns for purifying the resultant mixture; however, mesh openings in the range of about 15 to about 25 microns can be used. Availability of a higher screening area makes it possible to minimize melt temperature rise in the mixer/compounder, if desired.

Once the melt has passed through filtration in step (e), it is ready for pelletizing in step (f). This is accomplished as follows: The molten polymer is extruded through a die plate normally containing about 400 to about 1000 capillaries of about 2.2 to about 3.0 millimeters in diameter. Molten polymer extruded through the die capillaries enters into a chamber through which water is circulated for the purpose of freezing the polymer into strands. As the strands freeze they are cut into cylinders by rotating knife blades at a cutting frequency which yields cylindrical granules of about 3.0 to about 4.0 millimeters in length and diameter.

Vulcanization involves heating the thermoplastic intermediate to about 55 to about 85 degrees C; adding and homogenizing cross linking agent(s) with the thermoplastic intermediate; and annealing the mixture at about 55 to about 85 degrees C to impregnate the intermediate with the crosslinking agent, followed by cooling the thermosetting product to about 25 to about 50 degrees C to reduce additive loss and discoloration. The entire vulcanization portion of the process takes about 6 to about 18 hours. Steps (g), (h), and (i) are involved here. In step (g), the pellets are introduced into a spraying chamber. This chamber is operated in a static condition, i.e., there are no moving parts. The chamber can be in the form of one or two units. In a two unit structure, the upper unit is a spraying chamber and the lower unit is a blending chamber, i.e., a static blender, which is used in conjunction with the spraying chamber. The combination spraying and blending chamber(s) may be referred to as a "spraying chamber". An inverted cone is located inside the spray chamber which distributes pellets to form a skirt for better coating of pellets. The crosslinking formulation, which includes an organic peroxide and may include a scorch retarder and a cure booster are sprayed on the falling pellets inside the spraying chamber and above the blending chamber. It will be understood that more than one organic peroxide, scorch retarder, or cure booster can be used if desired. The scorch retarders (or inhibitors) and the cure boosters, which can be used in the process of the invention, are conventional and are well known in the art. The spraying, blending, and coating is effected in step (h). In step (h), the moving pellets, some partially coated with the crosslinking formulation and other still dry pellets gravity flow inside the blending system. Because of the unique design of the blending chamber, by the time the pellets reach the exit of the chamber, essentially all of the pellets have a uniform coating of the crosslinking formulation. The next step, step (i), is the annealing step. This can be accomplished by storing the pellets in an insulated bin to allow adequate time for impregnation of the crosslinking formulation into the pellets. Depending on the polymer morphology, pellet geometry, and the amount of organic peroxide, this time can be about 1 to about 20 hours, with a typical soaking time of about 8 to about 16 hours. The term "annealing" is defined as keeping the pellets at temperature of about 50 to about 90 degrees C with a typical temperature of about 70 degrees C.

Organic peroxides, which can be used as crosslinking agents in the process of this invention, can have a decomposition temperature of about 60 to about 220 degrees C for a half-life of 10 minutes and are exemplified by the following compounds (the numbers set off by the parentheses are their decomposition temperatures in degrees C): succinic acid peroxide (110), benzoyl peroxide (110), t-butyl peroxy-2-ethyl hexanoate (113), p-chlorobenzoyl peroxide (115), t-butyl peroxy isobutylate (115), t-butyl peroxy isopropyl carbonate (135), t-butyl peroxy laurate (140), 2,5-dimethyl-2,5-di(benzoyl peroxy)hexane (140), t-butyl peroxy acetate (140), di-t-butyl diperoxy phthalate (140), t-butyl peroxy maleic acid (140), cyclohexanone peroxide (145), t-butyl peroxy benzoate (145), dicumyl peroxide (150), 2,5-dimethyl-2,5-di(t-butyl-peroxy)hexane (155), t-butyl cumyl peroxide (155), t-butyl hydroperoxide (158), di-t-butyl peroxide (160), 2,5-dimethyl-2,5-di(t-butyl peroxy)hexane-3 (170), and alpha, alpha'-bis-t-butylperoxy-1,4-diisopropylbenzene (160).

The amount of organic peroxide can be in the range of about 0.05 to about 8 parts by weight based on 100 parts by weight of polymer, and is preferably in the range of about 0.1 to about 2 parts by weight per 100 parts by weight of polymer.

Examples of useful commercial mixer/compounders are as follows:

1. Werner and Pfleiderer twin screw, co-rotating, intermeshing compounder referred to as ZSK. Two lobe or 3 lobe screw profiles in a size range of 177 to 320 millimeters diameter are useful. It also can be single stage polymer mixer without a gear pump for melt pressurization through the die plate or a two stage system with a gear pump for melt pressurization through the die plate.

2. Kobe Steel twin screw, counter rotating, non or partially intermeshing compounder referred to as LCM or KCM. Size ranges of 230 to 380 millimeters in diameter are useful. This compounder is preferably used as a two stage system with gear pump for melt pressurization.

3. Farrel twin screw, counter rotating, non-intermeshing compounder referred to as FCM. The size range is 9 UM to 15 CM. This compounder has a combination of #7 and #15 rotors or 2 #15 rotors or 2 #7 rotors with a 2 lobe profile. This compounder is preferably used as a two stage system with gear pump.

4. Japan Steel Works twin screw, counter-rotating, non-intermeshing compounder known as CIM or CMP. The useful size range is 230 to 320 millimeter barrel diameter. Both CIM and CMP machines are used as two stage compounders.

The specific screw configurations and operating conditions for each type of commercial machine can be adjusted by one skilled in the art to match the preferred in-line operating conditions described above while providing adequate dispersion and distribution of additives in the thermoplastic intermediate.

A preferred vulcanization unit can be described as follows: The component parts of the unit can be manufactured by commercial suppliers skilled in the art of metal fabrication and finishing, solids material handling, and fluidization and heat transfer.

Polymer granules (pellets) are metered into a spraying or mixing chamber co-currently with a crosslinking agent. The polymer granules are dispersed over a cone shaped flow diverter. The crosslinking agent is introduced into the mixing chamber by a spray nozzle directing crosslinking agent flow co-current with the polymer granules. The nozzle used to deliver the organic peroxide produces a conical pattern of crosslinking droplets, which intersect the downward flowing polymer compound granules after they cross the flow diverter. A static blender is used in conjunction with the mixing chamber. It has no moving parts.

The static blender further homogenizes the crosslinking agent/polymer pellet blend before it is discharged to a vessel used to anneal the mixture and complete the impregnation. The vanes of the static blender are oriented at points 120 degrees apart on the circumference of the blender tube wall.

The blending system described here can be operated at throughput rates of about 4 to about 6 metric tons per hour and can be scaled by geometric means to be capable to operate over a range of about 1 to about 12 metric tons per hour.

The blending system described is advantageous because unlike conventional blending systems, it uses no moving parts to achieve a homogeneous mixture of crosslinking agent and polymer granules. Moving parts, such as blender agitators, may deteriorate with time, enter the product stream by attrition, and contaminate the product stream. There are no moving sealing surfaces as required with rotating equipment required to isolate the mixing process from external contamination. The mixing chamber and static blender are completely sealed from the external environment by non-moving gaskets or metal surfaces. To eliminate material hang-up in the mixer, the baffles are inserted through and welded onto the shell of the mixer without any supporting center rod. The angle and size of the vanes are also chosen to maximize uniform coating of pellets and eliminate material hang-up. The pellets pass over an inverted conical hat and through the annular gap between the cone and wall of the spraying chamber to form a skirt of pellets. Peroxide is sprayed on the falling pellets using an atomizing nozzle. The nozzle minimizes fog and mist formation to ensure a safe operation. The unit is kept at a temperature of about 40 to about 70 degrees C, preferably about 55 degrees C, to prevent peroxide freeze-up.

The thermosetting composition in the form of pellets or granules is typically extruded or co-extruded around electrical conductors as insulation, semiconductive shields, and jacketing to form power or other types of cable. The cable can be prepared in various types of conventional extruders such as those described in U.S. Pat. Nos. 4,814,135; 4,857,600; 5,076,988; and 5,153,382. All types of single screw and twin screw extruders and polymer melt pumps and extrusion processes will generally be suitable in cable fabrication. A typical extruder, commonly referred to as a fabrication extruder will have a solids feed hopper at its upstream end and a melt forming die at its downstream end. The hopper feeds unfluxed plastics into the feed section of a barrel containing the processing screw(s) that flux and ultimately pump the plastic melt through the forming die. At the downstream end, between the end of the screw and the die, there is often a screen pack and a die or breaker plate. Fabrication extruders typically accomplish the mechanisms of solids conveying and compression, plastics fluxing, melt mixing and melt pumping although some two stage configurations use a separate melt fed extruder or melt pump equipment for the melt pumping mechanism. Extruder barrels are equipped with barrel heating and cooling features for startup and improved steady state temperature control. Modern equipment usually incorporates multiple heating/cooling zones starting at the rear feed zone and segmenting the barrel and downstream shaping die. The length to diameter ratio of each barrel is in the range of about 15:1 to about 30:1. In a wire coating process, after passing through the breaker plate, the extrudate is pumped through a melt flow channel into a crosshead that reorients the polymer flow typically by 90 degrees such that it is directed to uniformly coat the conductor. In a wire coating extrusion process in which multiple material layers are applied to the conductor, the molten polymer from each extruder is independently pumped into a crosshead that is designed to coat the wire or conductor such that the different material layers are distinct, i.e., the material layers are not mixed in the crosshead. The multiple layer crosshead can be designed such that the multiple material layers coat the conductor simultaneously or in a discrete manner. In wire coating applications where the material is crosslinked after extrusion, the die of the crosshead feeds directly into a heating or crosslinking zone.

Because process equipment relative to the off-line process is eliminated, such as an additional polymer mixer/compounder, intermediate product heater, and blending systems which mechanically mix cure agents with granules, less capital expense is required to construct an in-line process. There is a reduction in the amount of labor and energy required to operate the in-line process compared to an off-line process because of a reduction to the amount of process equipment and complexity. Cleaner power cable products which cost less to produce and have very uniform curing characteristics with more stable additive retention are a result of this technology.

The patents and other publications mentioned in this specification are incorporated by reference herein.

The invention is illustrated by the following example.

EXAMPLE

The process of the invention, as described above, is used to produce 2.0 melt index ethylene homopolymer pellets of 4.5 millimeters in diameter and 2.25 millimeters in length, typical of thermoplastic power cable intermediate. A high pressure tubular polyethylene reactor operating at 7.0 metric tons per hour delivers molten polyethylene in the temperature range of 225 to 300 degrees C to a twin screw co-rotating extruder manufactured by Werner and Pfleiderer. This is the main extruder. It can be fed with additional additives or polymer(s) through a smaller extruder (sidearm) wherein the ratio of barrel bore diameters of the main and sidearm extruders is between 3:1 and 5:1. The compounding line, i.e., the main extruder, is physically connected to a low pressure vapor/solid separator, which is a part of the high pressure reactor, such that the rate through the extruder is equal to or greater than the rate of conversion (operating rate) of the reactor. The pellets then proceed as described above.

Samples of polymer pellets taken from the end of this process are tested by conventional means to determine the number of contaminants and the distribution by size of the contaminants identified. The method can be described as follows: An extruder and slot die are used to prepare a tape of the finished thermosetting compound. The tape prepared is about 38 to 51 millimeters in width and about 0.7 to 0.8 millimeter thick. The translucent extruder tape is continuously passed through an inspection device which locates inclusions in the tape where the tape is no longer translucent to the passage of light. These inclusions are identified as contaminants and are sized based on the speed of the tape through the scanner, the scanner motion relative to the tape, and the time duration of light occlusion through the tape. Commercial scanning systems based on laser or CCD camera scanning of the tape are available.

Typically the products made on a conventional two step process contains 1 to 2 contaminants in the 100 to 200 micron range per 1.0 kilogram. In the process of the invention both thermoplastic samples taken at the exit of the mixer/compounder and the thermosetting samples taken from the vulcanization unit are measured by the technique described. These samples are determined to have a contamination level of zero in the 100 to 200 micron range in 1.0 kilogram of product. These values indicate production of a clean product.

We claim:

1. A process for the preparation of a thermosetting composition comprising the following steps:

(a) maintaining the process in an essentially oxygen-free state;

(b) introducing a first polymer directly from the polymerization reactor in which it was prepared, in molten form, into a mixer/compounder;

(c) reducing any higher pressure accompanying the first polymer from the polymerization reactor to the mixer/compounder to a pressure in the range of about 0 to about 5 barg;

(d) adding additives selected from the group consisting of antioxidants, second polymers, other polymer enhancing additives, and mixtures thereof to the mixer/compounder, and mixing same with the molten first polymer;

(e) passing the molten mixture from step (d) through one or more screens, each having a maximum opening size of about 25 microns;

(f) pelletizing the mixture from step (e);

(g) introducing the pellets into a spraying chamber, the interior of said chamber being operated in a static condition;

(h) spraying the pellets in the chamber with a crosslinking formulation including an organic peroxide and, optionally, a scorch retarder and/or a cure booster to coat the pellets; and (i) annealing the coated pellets to impregnate the pellets with the crosslinking formulation.

2. The process defined in claim 1 wherein the temperature in steps (b) through (d) is in the range of about 225 to about 300 degrees C at a reactor conversion rate of about 7.0 to about 12.5 metric tons per hour.

3. The process defined in claim 2 wherein the temperature in step (e) is in the range of about 250 to about 360 degrees C.

4. The process defined in claim 1 wherein the temperature in steps (g) through (i) is in the range of about 55 to about 85 degrees C.

5. The process defined in claim 1 wherein the dwell time in steps (b) through (f) is in the range of about 0.5 to about 6 hours and the dwell time in steps (g) through (i) is in the range of about 6 to 18 hours.

* * * * *